Sept. 6, 1932.  F. G. SCHWEISTHAL  1,876,472
AIRPLANE CONSTRUCTION
Filed Nov. 18, 1929  2 Sheets-Sheet 1

Inventor
Fred G. Schweisthal

Sept. 6, 1932.     F. G. SCHWEISTHAL     1,876,472
AIRPLANE CONSTRUCTION
Filed Nov. 18, 1929     2 Sheets-Sheet 2
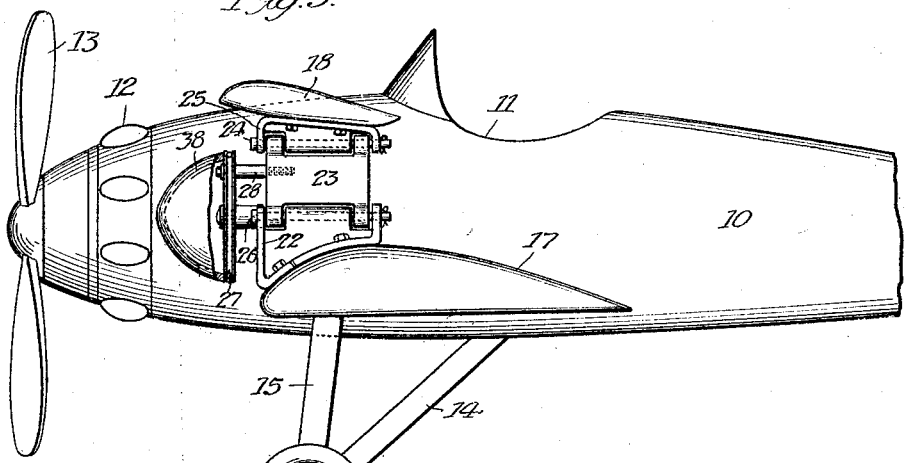
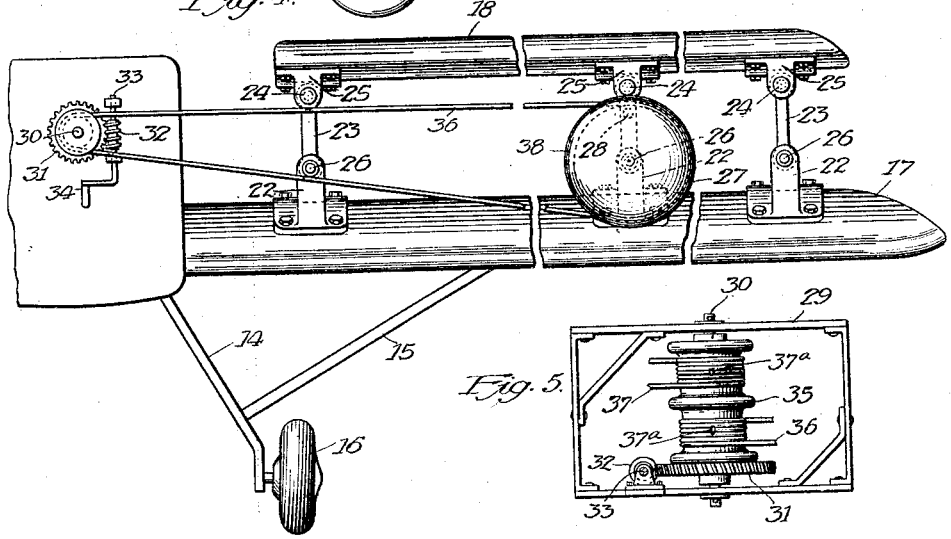
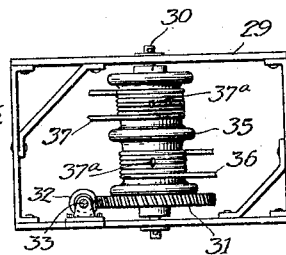
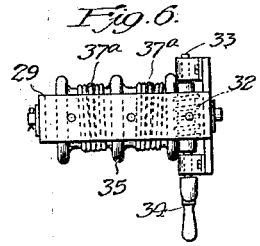
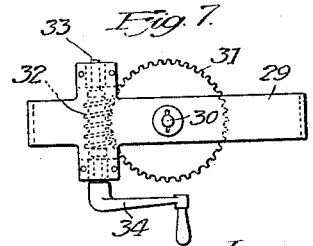
Inventor
Fred G. Schweisthal Patented Sept. 6, 1932

1,876,472

UNITED STATES PATENT OFFICE

FRED G. SCHWEISTHAL, OF CHICAGO, ILLINOIS

AIRPLANE CONSTRUCTION

Application filed November 18, 1929. Serial No. 407,865.

My invention relates to a wing system for airplanes and the like, which has for its primary object the provision of an airplane having basic wings or air foils of the usual construction, and secondary or auxiliary wings or air foils preferably of lesser chord than the basic wing, positioned above and adjacent thereto, spacing partitions from the leading to the trailing edges of essentially the same dimension as the chord of auxiliary air foils, whereby in their relation laterally throated Venturi cellule passages are formed, providing a means which streamlines the air flow adjacent the wing surfaces, retarding an early angle of the burble point with the partitions preventing the escape of air in a lateral direction, producing in effect, by this structure, compression chambers from the throat to the leading edges, and expansion chambers from the throat to the trailing edges, thus increasing the efficiency of lift of the wing system.

A further object of my invention is the provision of wing construction for airplanes which provides planes with greater lifting power than the planes now in use in proportion to the wing surface, and has therefore greater carrying capacity.

Another and further object of my invention is to provide an airplane having wing construction which enables an airplane to rise more quickly and at a greater angle than the airplanes now in service.

Still another object of my invention is to provide an airplane which can be landed more easily and at less speed than is now safe, and in which there is very little shift in location of the center of pressure and there is not the tendency to "nose over" that is in the present type of plane, and produces stability of the airplane because of its inherent feature in substantially locating the center of pressure with respect to the trailing edge of the auxiliary wings. A material increase in velocity to the air flow at the throat of the venturi is provided by this structure, thereby producing, in accordance with the well established laws of physics, a large reduction in pressure at the throat of the venturi where the velocity of air flow is greatest, and thus in the air stream by their coordinated relation effectively increases the value of vacuum to area above the upper surface of the adjacent wing.

Another and further object of my invention is the provision of an airplane having primary and secondary air foils having Venturi surfaces adjacent to each other, and also in which the forward edge of the secondary air foil preferably extends ahead of the forward edge of the adjacent air foil, so that regardless of whether the plane is ascending or descending, the secondary air foil in effect is leading the primary air foil.

In effect the operation of the structure may be explained in this way. The lift to a conventional air foil is due to the velocity of an air stream over and under it. The higher the speed the greater the lift, and conversely, the lower the speed the less the lift.

For a given airplane and fixed load, there is a required air speed to produce lift. If the velocity of the air is high with respect to the ground, the airplane takes off and lands at a slow speed with respect to the ground, and if the air velocity is low with respect to the ground, the airplane requires higher speeds to take off and land, considered with respect to the ground. As about 70% of the lift to the airplane is due to reduced pressure above the wings, when the velocity of the air stream over the wings is increased, the pressure is correspondingly reduced, and therefore resolves itself into the provision of some means of increasing the velocity of the air stream over the wing. To accomplish this result I preferably employ small chord auxiliary air foils placed closely above and parallel to, and preferably somewhat ahead of, the leading edge of the large or basic wings or adjacent air foils. These auxiliary air foils being located closely above the basic air foils, act as an accelerating means to the air stream and being of small chord allows a considerable area of low pressure above the basic air foil to communicate vertically with the atmosphere, bringing about a condition of increased lift to an airplane.

Another and further object of my invention is the provision of wing structures for airplanes comprising basic wings or air foils and secondary air foils adjustable with respect to each other upwardly and downwardly, whereby flow of air through the aperture of the Venturi cellule passages between the wings can be varied by the operator from the cockpit of the plane.

Still another object of my invention is the provision of an airplane having basic and secondary wings, preferably of substantially the same chord, with Venturi cellule shaped passageways therebetween, with the upper wings having slots therethrough providing means to give the airplane increased lifting ability at somewhat slower speed, for use particularly in freight service.

These and other objects will be more fully and better understood by reference to the accompanying sheet of drawings, in which—

Figure 3 is a side elevational view of an airplane showing one of the basic wings and its auxiliary wing with means for adjusting the auxiliary wing with respect to the basic wing;

Figure 4 is a front view of the airplane shown in Figure 3;

Figure 5 is an elevational view of the adjusting mechanism adapted to be mounted in the cockpit of the airplane;

Figure 6 is an end view of the mechanism shown in Figure 5;

Figure 7 is a side view of Figure 5;

Figure 1:
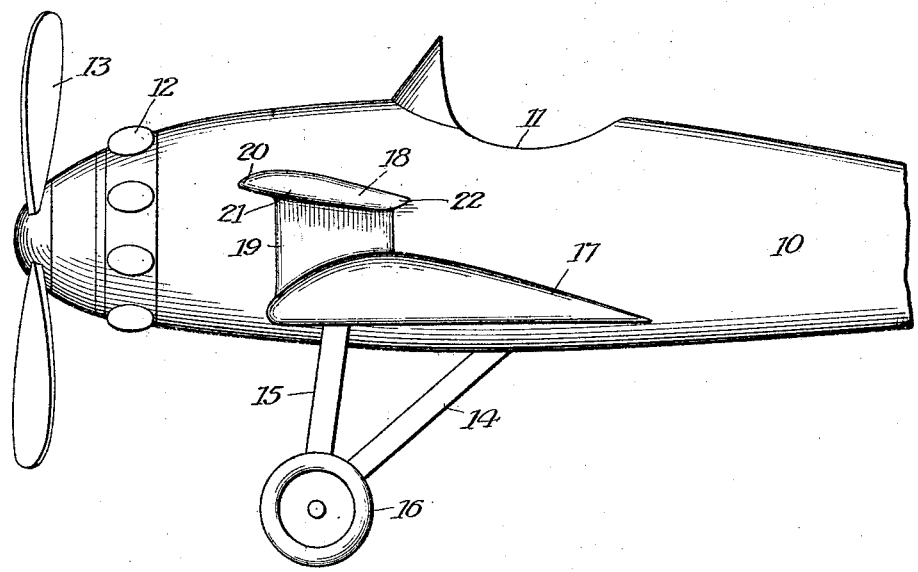
Figure 1 is a partial side view of an airplane embodying my improved wing structures, the basic and secondary wings being in fixed relation with each other.
Figure 2:
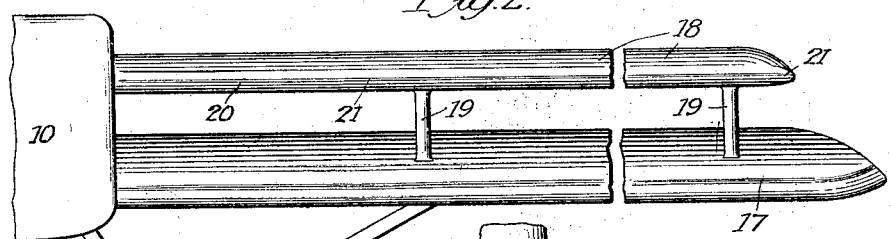
Figure 2 is a front view of one side of an airplane showing the air foils on one side of the fuselage.

Referring now specifically to the drawings, in which like reference characters refer to like parts throughout, I provide a body 10, having a cockpit 11 therein, a motor 12 mounted therein, with the usual propeller 13 being mounted upon the engine shaft. Vertical braces such as 14 are provided, to which side struts 15 are secured at one of their ends, with landing wheels 16 provided, and basic air foils 17 of the usual contour and mounted to the body 10 in the usual manner. These air foils or wings 17 extend outwardly from each side of the body 10 and are of the usual type and construction, and are secured to the fuselage of the plane in the usual manner.

Mounted above the basic air foil 17 is a secondary air foil or wing 18, which at its inner end is secured to the body 10, and has a series of vertical webs or partitions 19, 19 which connect the secondary air foil 18 with the basic air foil 17. The air foil 18 is preferably slightly angularly disposed with respect to the horizontal plane of the basic air foil 17, but may be horizontal, and has its forward edge 20 extended forward of the front edge of the basic air foil 17. The contour of the under surface 21 is similar to the contour of the upper surface of the basic wing 17.

In my improved structure the basic wing 17 is substantially of the usual chord and camber except the upper surface towards the leading edge is abruptly formed, then positioned above and forward of the leading edge of the basic wing and adjacent thereto is placed the secondary wing 18, preferably very much less in chord. The rear or trailing edge of the secondary wing 18 terminates slightly back of the throat of the venturi thus formed, and the lower surface of the secondary wing 18 diverges upward gradually from the throat to the trailing edge and abruptly upward from the throat to the leading edge, streamline spacing partitions 19, 19 connecting adjacent Venturi surfaces forming cellules with the wings preferably terminating at the leading and trailing edges of the secondary wing 18, thus essentially forming from leading to trailing edges, Venturi cellule passages.

The rear edge 22 of the secondary air foil 18 terminates back of the throat a short distance, in order that the potential value of vacuum above the exposed area of the basic air foil 17 be as great as possible and result in a large mean effective lift distribution which tends to substantially fix the center of pressure for various angles of attack. The upper air foil 18 may be spaced varying distances above the basic air foil 17, but much less than the distance between the wings of the conventional biplane. I prefer to place the upper air foil 18 at such distance that the gap dimension of the throat of the venturi is preferably ten to twenty percent of the chord of the lower or larger air foil 17, and less than forty percent of the chord of the basic air foil, these dimensions being taken at the center of the span. It will be understood that the term "throat" as applied to the Venturi passage means that point in the passage where the adjacent surfaces are closest together.

This fixed wing type of structure is adapted primarily for use in planes having a great load carrying capacity and in which speed is not so requisite.

In Figures 3 to 7 inclusive, wing structures movable to each other are shown, with means whereby the air flow through wings may be varied from the cockpit of the plane. Secured to the basic wing 17 is a pair of brackets 22, 22 in spaced relation with each other with pivotally mounted partition members 23, 23 thereon which are connected by means of pins 24, 24 to brackets 25, 25 which are secured to the upper or auxiliary air foil 18. Pins 26, 26 are provided which pivotally secure the members 23, 23 onto the brackets 22, 22, one of these pins having a sheave 27 mounted thereon and which is connected by means of a pin 28 to the member 23 adjacent to which the sheave 27 is located.

Mounted in the cockpit of the airplane is a frame 29 having an axle 30 extending therethrough with a gear 31 mounted thereon and which is adapted to be operated by a worm 32 mounted upon a shaft 33 which has a crank 34 mounted thereon by means of which the operator can rotate the gear 31. A drum 35 is mounted on the axle 30 and is adapted to be rotated by the operator with the crank 34, and has cables 36 and 37 thereon which are adapted to extend to the side and around the sheave 27 on one side and a corresponding sheave (not shown) on the other. The cables 36 and 37 are wrapped around the drum a plurality of times and clamped at the center portion, which never unwraps, by a clamping bolt 37a, and also in order to provide sufficient friction so all the strain is not localized at the clamping bolt. They are wound around the drum in opposite directions so that as the drum is rotated, the auxiliary air foils on each side can be jointly raised or lowered. A faring 38 is placed over the forward surface of the sheave 27 in order to streamline this sheave so that it offers as little drag as possible. I prefer to use a sheave pulley, because of maintaining a uniform moment arm about its center, to raise or lower the secondary air foil.

In this type of structure the upper air foil is lowered by the operator previous to the ascending of the plane to a position for maximum lift where experience may determine, thus giving the air which passes between the upper air foil and the basic wing a great increase in velocity, and then when the airplane has reached the height desired, the upper air foils are raised to their extreme limit so as to decrease the drag incident to its close proximity to the basic wing, and allow for greater speed of the plane. When a landing is to be made, the upper wings are lowered to a predetermined distance over the surface of the lower or adjacent wings and in this manner for the increase lift effected, a decrease in speed is possible, so that the speed of the plane is decreased for landing purposes.

Figure 8:
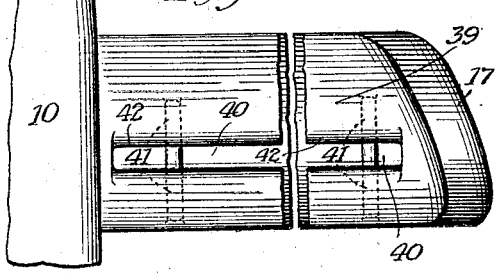
Figure 8 is a plan view of a modified form of secondary air foil of substantially the same chord as the basic wing having a slot therethrough.
Figure 9:
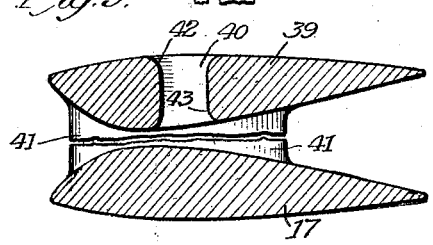
Figure 9 is an end view of the wings shown in Figure 8.

In Figures 8 and 9 a modified form of upper air foil is illustrated having vertically extending slots therethrough, through which air may pass in a downward direction into what may be termed the expansion passage of the venturi, located slightly back of the throat of the Venturi passage. The plane body 10 is shown and the basic wing 17, with an upper air foil 39 mounted thereon by either of the means heretofore described. The upper air foil is substantially of the same chord as the basic wing and may be the same length or shorter, if desired. The air foil 39 has a slot 40 therethrough which terminates at the bottom of the air foil 39 a short distance back of the throat of the Venturi passage, and extends parallel with the leading edge throughout the greater portion of the length of the air foil 39. Partitions 41, 41, extending from the leading edges backward towards the trailing edges, are provided by means of which the upper air foil 39 is spaced from and mounted upon the basic wing 17, creating cellule passages thereby.

In this modified form the under surface of the auxiliary air foil is substantially of the same contour as the upper surface of the basic wing 17. The contours of these adjacent surfaces is characterized by the fact that from the throat of the Venturi passage forward to the leading edges of the wings the curvature is abruptly diverging, while from the throat of the Venturi passage backward to the trailing edges, the surfaces of these wings gradually diverge. Adjacent the slot 40, the upper forward portion of the wing 39 is rounded off at 42, while the lower edge of the rear portion of the wing 39 is similarly rounded at 43 to streamline the air current passing downward through the slot 40, and into the expansion cellule of the Venturi passage back of the throat. With this form, in an air stream the air velocity through the venturi is materially increased with a corresponding reduction in pressure upwardly, which gives increased lifting power to the plane. The drag on the wings is also somewhat increased, which decreases the speed of the plane, so that this form is desirable for planes for slower speeds, but heavier carrying capacity.

While I have described more or less precisely the details of construction, I do not wish to be understood as limiting myself thereto, as I contemplate changes in form and the proportion of parts and the substitution of equivalents as circumstances may suggest or render expedient without departing from the spirit or scope of my invention.

I claim:

1. An airplane, basic wings on said airplane having curved upper surfaces, and auxiliary wings above said basic wings having curved lower surfaces, and forming with said basic wings horizontally extending passages having a comparatively narrow throat, the degree of divergence of surfaces of said basic wings and said auxiliary wings being abrupt at their forward portions and gradually diverging from the throat to their trailing edges.

2. An airplane, basic wings on said airplane, auxiliary wings mounted thereon and forming with said basic wings Venturi passages having throats between the upper points of the lower wings and the lowest points of the upper wings, the chord of the auxiliary wings being less than the chord of the basic wings, and connecting means near both lateral ends of the wings preventing spreading of the air flow laterally between said wings.

3. An airplane, basic wings mounted thereon, auxiliary wings on said basic wings, pivotal connections for parallel displacement between said auxiliary wings and said basic wings, sheaves on some of said pivotal connections, drums in the cockpit of the airplane, and cables extending from said drums over said sheaves.

4. An airplane, basic wings on said airplane, and auxiliary wings thereon and forming with said basic wings Venturi passages therebetween having throats between the upper points of the lower wings and the lowest points of the upper wings, said auxiliary wings having slots therethrough near and not forward of the Venturi throat.

5. An airplane, basic wings on said airplane, and auxiliary wings thereon and forming with said basic wings Venturi passages therebetween, the said auxiliary wings having vertical slots therethrough which are parallel to the leading edges and communicate with the expansion chamber of said Venturi passages.

6. An airplane, basic wings on said airplane, and auxiliary wings thereon and forming with said basic wings Venturi passages therebetween, the said auxiliary wings having vertical slots therethrough which are parallel to the leading edges and communicate with said Venturi passages back of the throat of said Venturi passages.

7. An airplane, basic wings on said airplane, and auxiliary wings thereon of substantially the same chord as said basic wings and forming with said basic wings Venturi passages therebetween, the adjacent surfaces of the basic wings being substantially of the same contour and formed with abrupt diverging surfaces forward of the throat of the Venturi passages to the leading edges of the said wings, and gradual diverging surfaces back from the throat back to the trailing edges, the said auxiliary wings having vertical slots therethrough located near and not forward of the throat of the Venturi passage.

8. An airplane, basic wings on said airplane, auxiliary wings thereon forming with said basic wings Venturi passages therebetween, and pivotal connections for parallel displacement between said wings, said pivotal connections being so constructed as to form partitions to minimize the lateral flow of air from between said wings, at all positions of displacement of said wings.

9. An airplane, basic wings on said airplane, and auxiliary wings thereon and forming with said basic wings Venturi passages therebetween, the said auxiliary wings having slots therethrough which are parallel to the leading edges and communicate with said Venturi passages back of the throat of said Venturi passages.

10. An airplane, basic wings on said airplane, auxiliary wings mounted over said basic wings, the adjacent surfaces of said two wings having sufficient camber to form Venturi passages between said wings, said auxiliary wings having slots therethrough which are generally parallel to the leading edges and communicate with said Venturi passages near and not forward of the throats of the Venturi passages.

Signed at Chicago, Illinois, this 14th day of November, 1929.

FRED G. SCHWEISTHAL.